Nov. 13, 1956  H. J. KISTNER ET AL  2,770,189
CARD INTERPRETING MACHINE FOR DETECTING
DOUBLE PUNCHINGS AND BLANK COLUMNS
Filed Nov. 14, 1955  6 Sheets-Sheet 1

INVENTORS
HAROLD J. KISTNER
JOHN C. VEBURG
BY
Burton P. Beatty
ATTORNEY

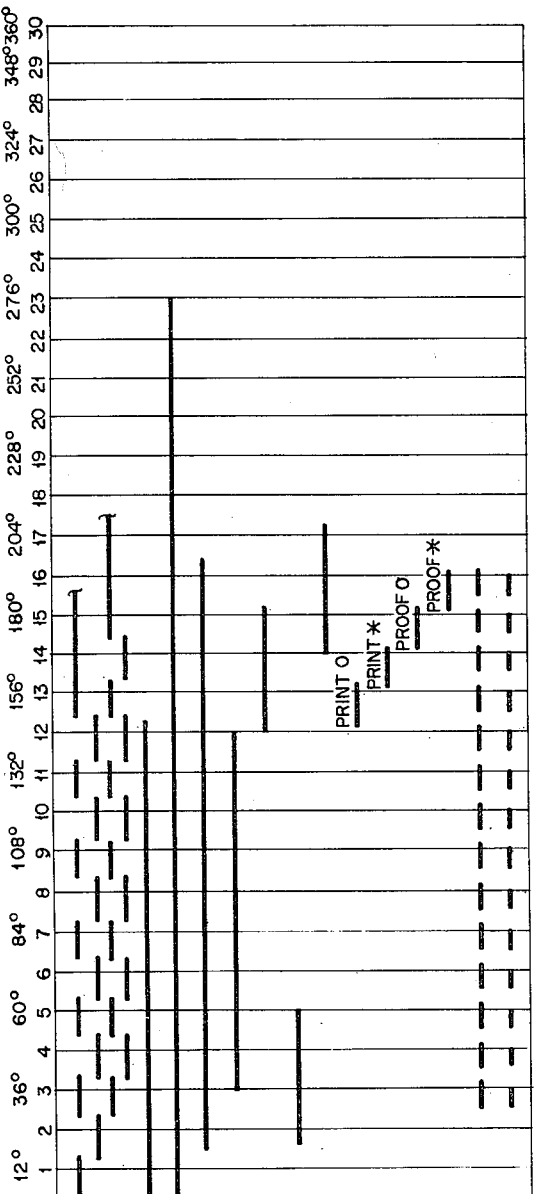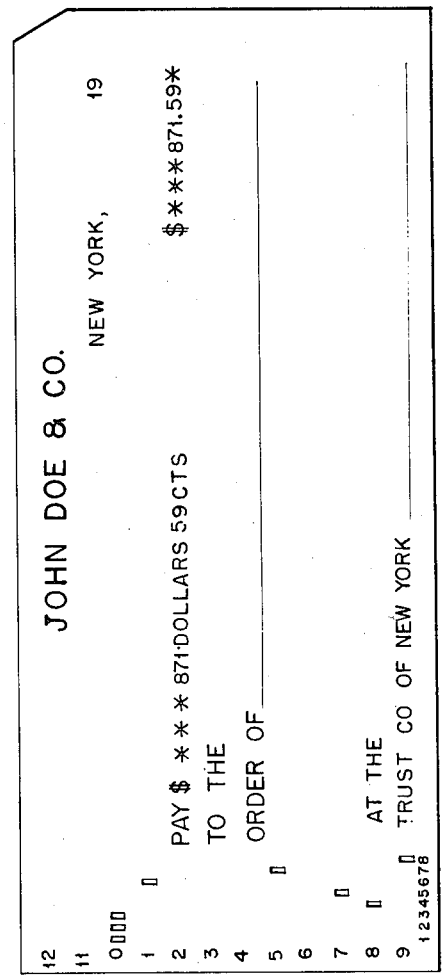

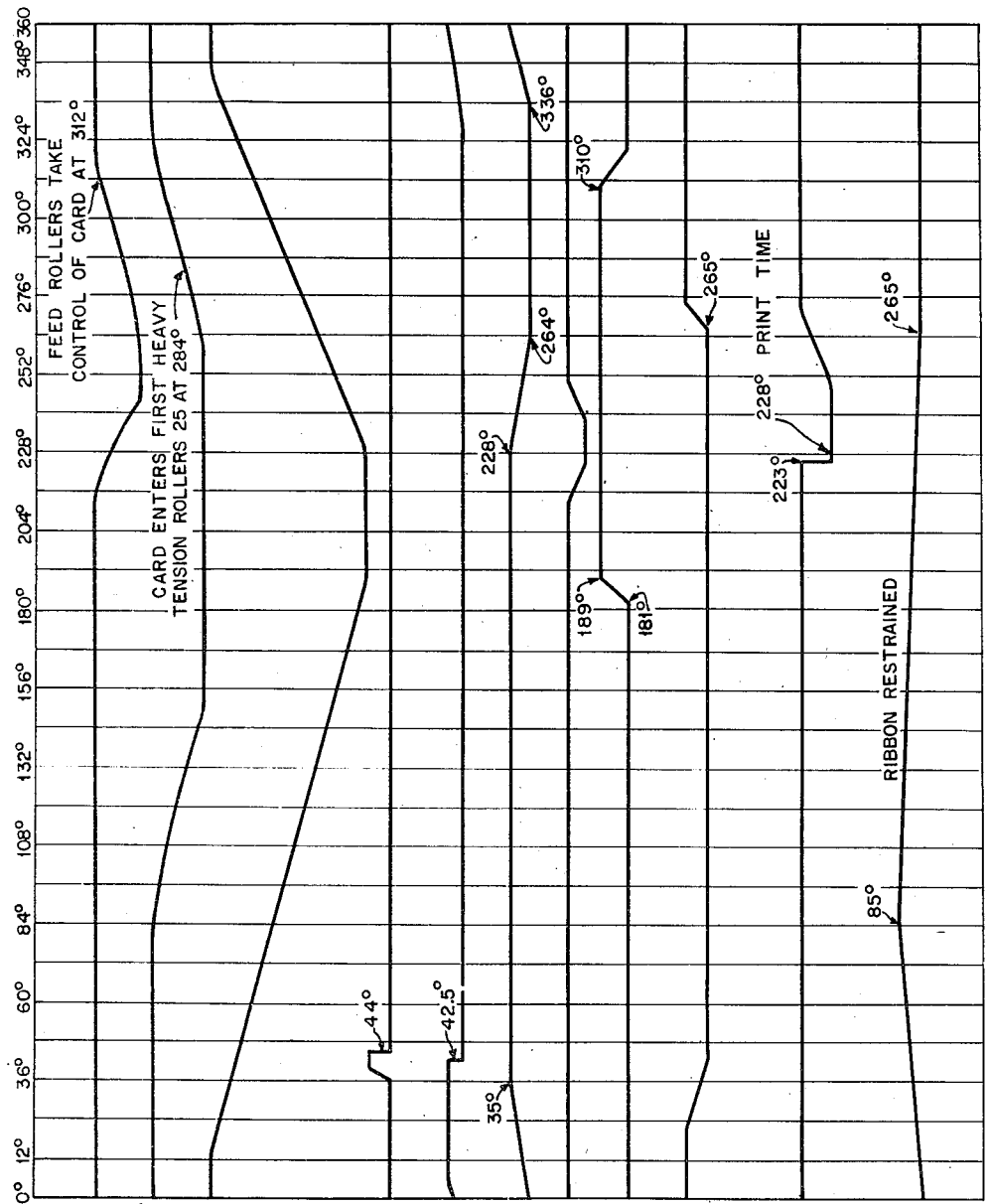

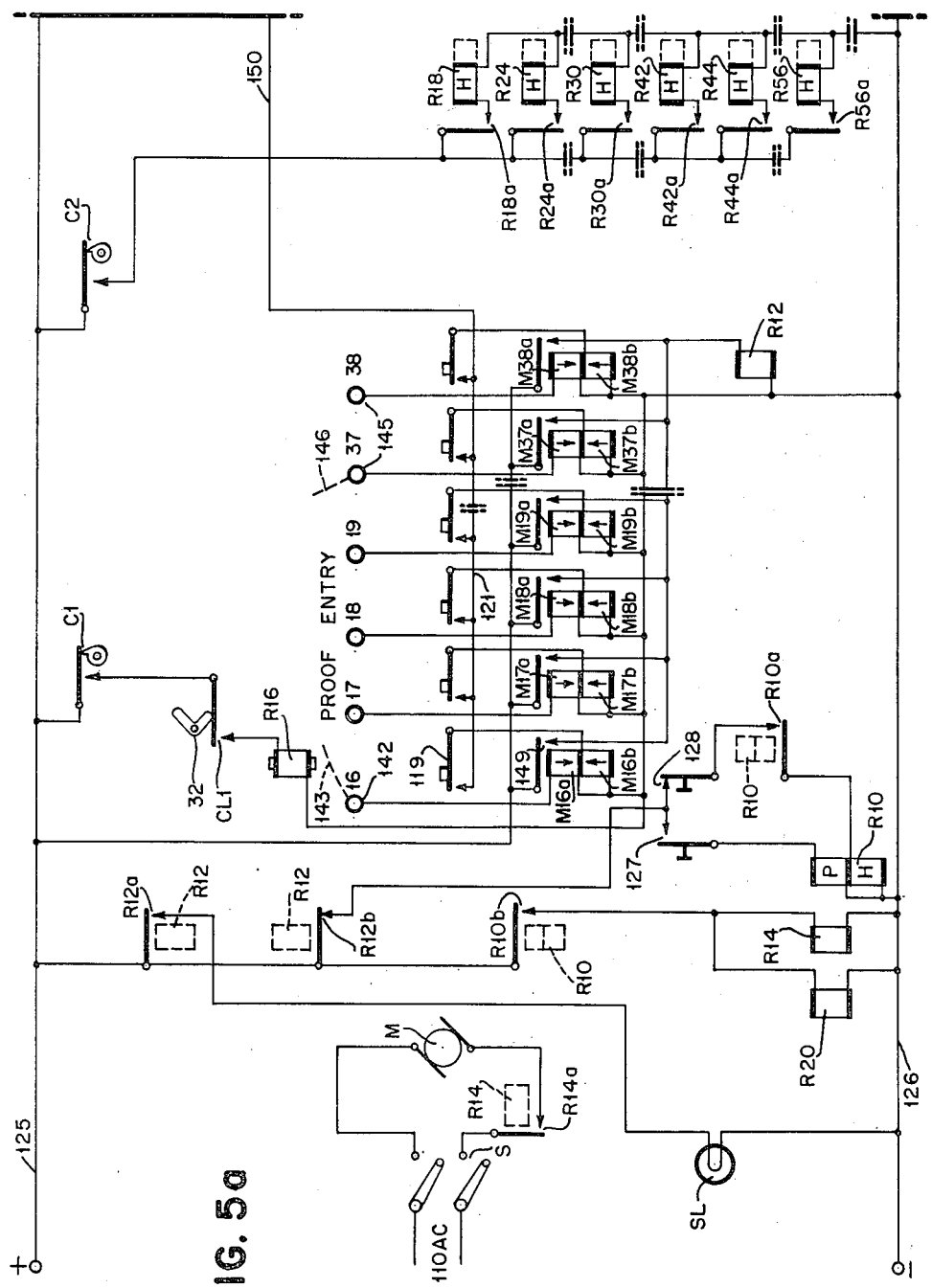

INVENTORS
HAROLD J. KISTNER
JOHN C. VEBURG
BY Burton P. Beatty
ATTORNEY

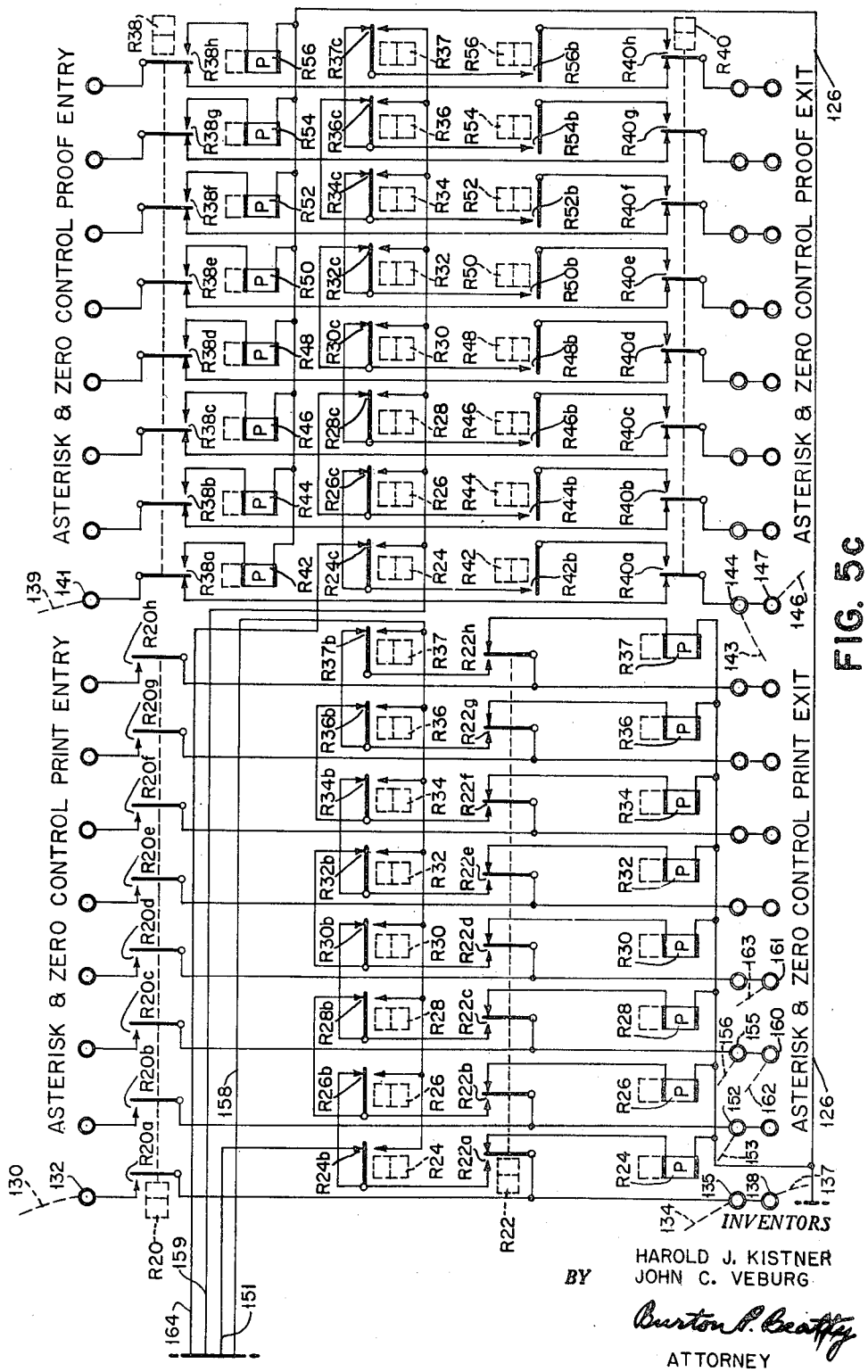

United States Patent Office 2,770,189
Patented Nov. 13, 1956

2,770,189

CARD INTERPRETING MACHINE FOR DETECTING DOUBLE PUNCHINGS AND BLANK COLUMNS

Harold J. Kistner, Endicott, N. Y., and John C. Veburg, Richmond, Calif., assignors to International Business Machines Corporation, New York, N. Y., a corporation of New York Application November 14, 1955, Serial No. 546,574

6 Claims. (Cl. 101—93)

This invention relates to printing machines and more particularly to improvements in the type known generally as interpreters wherein data derived from a record element is printed upon the element.

Machines of this type operate in conjunction with the well known IBM card in which a single designation in a column represents a character or numeral and all of the card columns contain designations representing the digits 0–9 or a particular character. These machines are utilized for printing on perforated record cards to form checks issued for payment of some monetary transaction.

Machines of the above type have been found to be highly accurate in their operations when used commercially. Nevertheless, any single instance of improper printing should be guarded against, however rare its occurrence. The absence of a designation or the presence of more than one designation in a column indicates an error in that column. The present invention provides means for sensing and detecting incorrectly designated cards of the character described.

The improvements of this invention relate to electrical circuits for detecting double punched and blank columns in a record card and the invention has for its principal object the provision of novel sensing and error detecting circuits for an interpreting machine.

Briefly, the machine of the present invention utilizes record cards which have a plurality of columnar orders each of which has zone and digit index point positions. The error detecting circuits which comprise this invention are controlled by checking brushes which sense the card perforations two cycle points after the conventional reading brushes. These circuits detect double punchings consisting of a zone and a digit punch or a double digit punch. If a column does not contain a punching in either the zone or digit index point positions, it is a blank column and the circuits are arranged to detect this condition. When any one of these conditions exists, the error is indicated through comparing means.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 2 is a representation of a typical check capable of being printed by the machine disclosed herein.

Fig. 3 is a timing diagram which can be followed to understand the various operations of mechanism shown herein.

Fig. 4 is a timing chart showing the timing desirable to close certain electrical contacts and circuits.

Figure 5B:
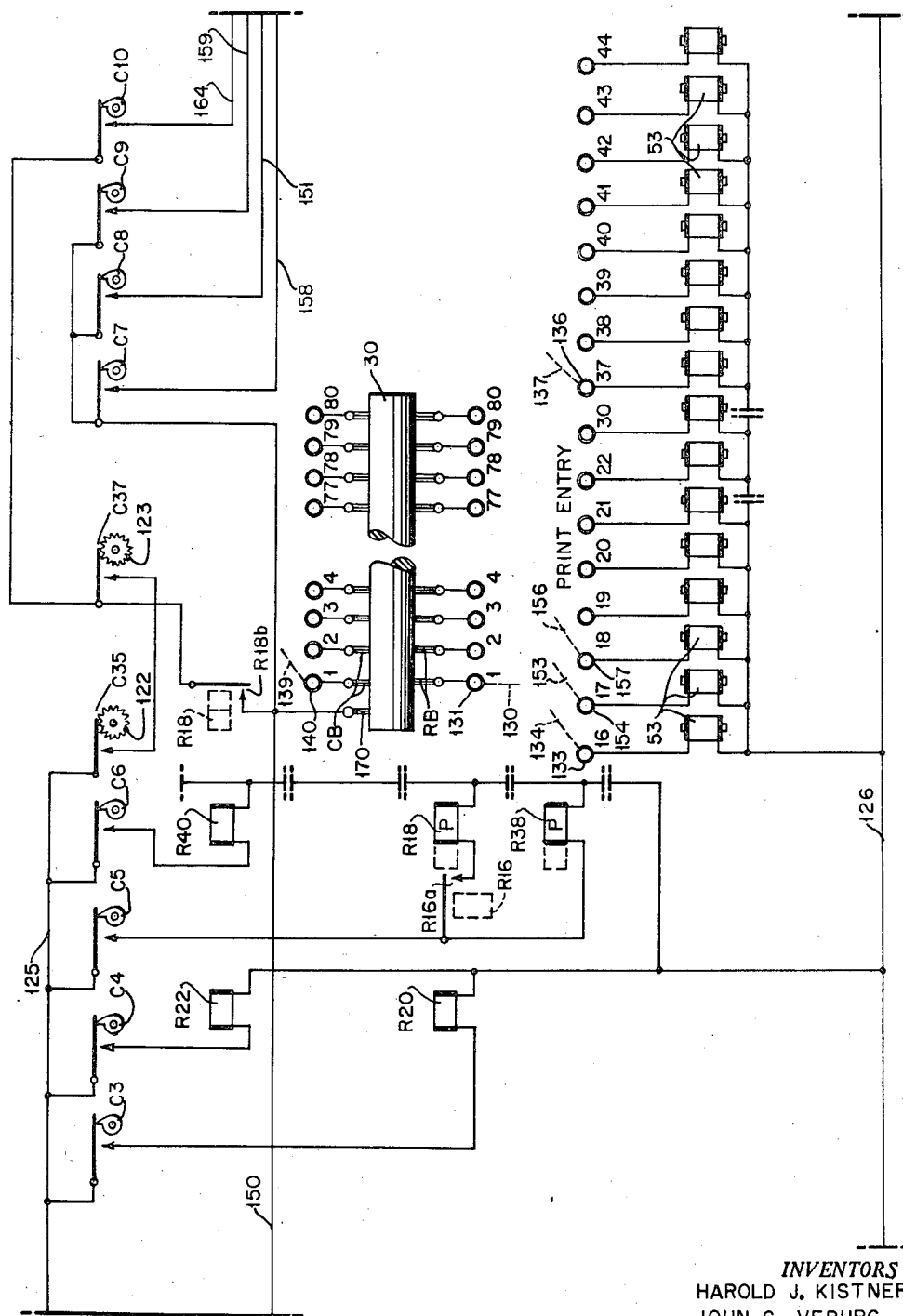

Figs. 5a, 5b and 5c taken together comprise an electrical wiring diagram of the preferred form of the invention.

*General description*

Figure 1:
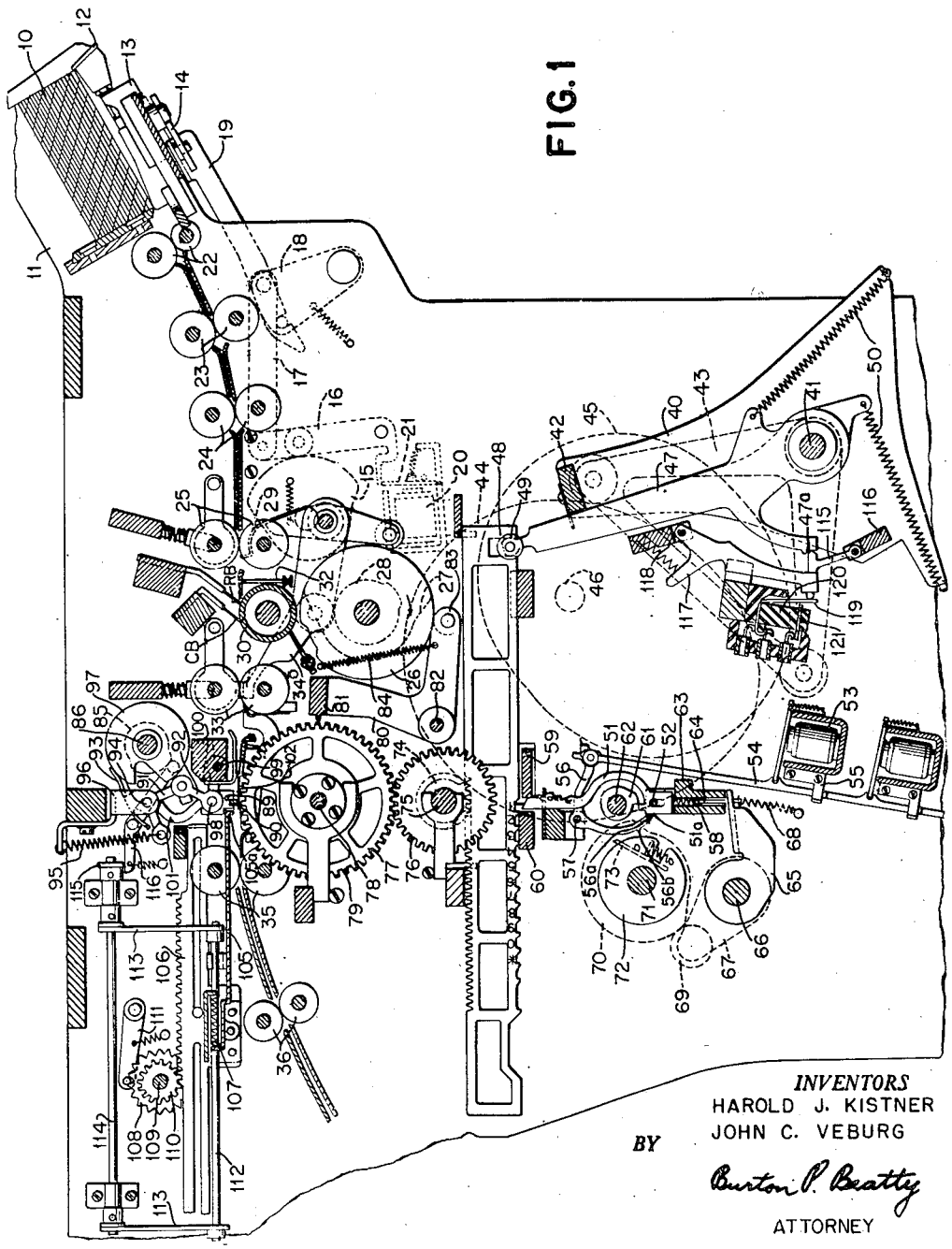
Fig. 1 is a longitudinal sectional view of the machine showing the card feeding, sensing and printing devices.

Referring to Fig. 1, a group of record cards 10 are contained in a supply magazine 11 and are fed singly from the bottom of the magazine by means of a picker 12 carried by slidable pusher 13. Connected to pusher 13 is a reciprocable bellcrank 14. This bellcrank is reciprocated by a cam 15 through linkage members 16, 17, 18 and 19. In Fig. 3 it is seen that cam 15 is so formed as to cause the picker 12 to engage the bottom card at 216° of a machine cycle to move the card from the magazine. A magnet 20 is provided to control the operation of the picker mechanism. The armature 21 of magnet 20 normally engages the lower portion of cam follower 16 to render the picker mechanism ineffective. When the magnet is energized, armature 21 is withdrawn to permit operation of the picker. The bottom card in magazine 11 is thereby advanced to the first pair of feed rollers 22 which take control of the card at 312° (Fig. 3).

The driving means for reciprocating the pusher 13 and rotating the card feeding rollers and other mechanical parts to be subsequently described is fully shown and described in copending application Serial No. 356,042 of G. F. Daly et al., filed May 19, 1953.

When the bottom card is fed out of the magazine 11, it is conveyed from rollers 22 to the sensing station by succeeding pairs of rollers designated 23, 24 and 25. A trio of cams designated 26, 27 and 28 are constantly rotated during machine operation and control various card feeding operations and the type aligner mechanism. The feed rollers 25 are skid rollers and advance the cards against a stop plate 29 which functions as a timing shutter in that it intercepts a card and then releases it for further advance at a definite time. This plate 29 is moved into the path of an advancing card by cam 27 beginning at 93° in the machine cycle (Fig. 3). The card is stopped against the plate 29 at approximately 150° and is later released after 258° when the plate is again withdrawn. Feed rollers 25 then advance the card to the sensing station.

A line of sensing brushes RB (Fig. 1) are located at the reading station to read the perforations in each record card as it passes beneath the brushes. These brushes RB make wiping contact with a common contact roller 30. Spaced a distance beyond brushes RB is a second row of brushes designated CB and identified as the checking brushes. The distance between the brushes RB and CB is two machine cycle points. The brushes CB also cooperate with the roller 30 to again read the perforations. These brushes RB and CB and contact roller 30 are of conventional structure such as is commonly used in electrically controlled interpreting machines.

Between the feed rollers 25 and the contact roller 30 is located the usual card lever 32 which is rocked about its pivot by a passing card to close the usual card lever contacts CL1.

A pair of rollers 33 dispatch the cards from the reading station to the printing station at the proper time in each cycle for the printing operation. These rollers are operated by cam 28 through arm 34. Referring to Fig. 3, it is seen that the upper rollers 33 are separated by camming action of arm 34 from the lower rollers 33 from approximately 189° to 310° of a machine cycle, whereupon the rollers again close to the card feeding position. It is noted that rollers 33 are open at the printing time to prevent excessive pressure of a card against the card stop located at the printing station, which is described hereinafter.

At the printing station is located a mechanism which functions to stop the card in any one of twenty-three positions to present any one of twenty-three lines of the card to receive printing from a row of type wheels. This mechanism comprises a stop or shutter 105 which is pivotally mounted on one end between a pair of slidable racks 106. The other end of stop 105 has a turned down portion 105a which projects into the path of the advancing record cards under pressure of a spring 107. A detent wheel 108 is secured on a shaft 109 carrying a pair of pinions 110. These pinions are in mesh with gear teeth on the upper surface of the racks 106. The stop 105 can thus be positioned by hand to a predetermined setting and locked in position by means of a spring urged detent arm 111.

A bar 112 is supported between a pair of lifting arms 113. These arms are secured on a rod 114 which carries an operating lever 115. The lever 115 is engaged by a cam follower 116 which is held against the surface of a cam 85 fastened on a constantly rotating shaft 86. When the follower encounters the rise on cam 85 at 265° (Fig. 3), the lever 115 is moved upwardly to actuate arms 113 and the bar 112 engages the under surface of stop 105 to raise it out of the path of the printed card.

After the printing operation, the cards are advanced to the usual card stacker mechanism (not shown) through succeeding pairs of rollers 35 and 36.

Print selector mechanism

Referring again to Fig. 1, a type rack follower arm 40 is fastened on a shaft 41 and carries a crosshead 42. Shaft 41 is rotatably mounted in the machine side plates and has a triangular shaped cam follower 43 fastened thereto which cooperates with a pair of complementary cams 44 and 45 secured to the main machine camshaft 46. The came follower and complementary cams are disclosed in detail in the aforementioned application of Daly et al. These cams act to positively rock the shaft 41 during each machine cycle of operation. In Fig. 1, the follower arm 40 is shown in a neutral position before commencing a print selecting operation. Pivotally mounted on shaft 41 is a rack arm 47 which is slidably connected with a rack 48 through roller 49. This rack 48 is free to reciprocate in suitable support members. Rack arm 47 is urged against crosshead 42 by a spring 50 which is secured to the follower arm 40. From Fig. 3 it is seen that at approximately 11° cycle timing, the crosshead 42 moves upwardly to the right under the influence of the complementary cams and rack arm 47 follows it which in turn moves the rack 48 to the right with uniform motion. At 212° the crosshead 42 starts to restore and continues until 348°. The upward movement of the crosshead permits the rack 48 to move to the right under pressure of spring 50 until it is stopped by a spring pressed digit slide 51 as explained hereinafter. This slide is mounted for vertical movement on a stationary pivot pin 52. For purposes of this disclosure, only one rack arm 47 is shown, it being understood that a rack arm and associated rack and type wheel are provided for each column of selectable printing required.

The print selecting mechanism operates on the principle of positioning the rack 48 in one of a plurality of positions and by means of an intermediate gear, rotating a type wheel to present at the printing line the character corresponding to the selected rack position. The various rack positions are obtained from the sensing of a perforation in a column of the record card.

In the present machine, it is desirable to print selected numeric information in two positions on the card as shown by the amount ***871.59 in the representative card of Fig. 2. The machine includes 45 printing positions, each of which is provided with a type wheel. In order to print selected information in a printing position, a rack and selector mechanism is provided in that position to select the proper type on the wheel. However, the type wheels in positions 15, 22 through 28, 31 through 33, 36 and 35 are locked in position and do not require any selecting mechanism. These locked type wheels print the same characters on each printing operation, as explained later in connection with the operation of the machine.

The numeric positions are represented by the rack teeth numbered 0 through 9 on the bottom portion of the rack 48. An asterisk is set up using the rack tooth designated *. In setting up the numeric characters, the rack 48 is positioned by the digit slide 51 engaging one of the numeric teeth to stop the rack.

For the purpose of this description, it will be assumed that the numeric character 3 is to be set up on the type wheel and printed. The cards are fed under the brushes RB with the 12 index position first and it is seen in Fig. 4 that the 3 index position is read by the brushes RB between 63° and 75° of the cycle. A print magnet 53 is energized through the sensing of this perforation in the 3 position, as described hereinafter in connection with the description of the circuit diagram. A magnet 53 is provided in each order where selected information is to be printed and operates mechanisms identical with those about to be described. The armature of magnet 53 engages a link 54 which is suitably mounted for reciprocation and held in the position shown by a support member 55. The upper end of link 54 is pivotally connected to a trigger 56 which is freely mounted on a stud 57. The lower arm of trigger 56 has a turn-out flange 56a which is adapted for positioning in the path of a projection 51a on digit slide 51. As long as the trigger 56 is in the inoperative position shown in Fig. 1, the digit slide is prevented from moving upwardly. When magnet 53 is energized, the armature is moved against the core, and link 54 rotates trigger 56 about stud 57 in a clockwise direction, as viewed in Fig. 1, to remove flange 56a from the path of projection 51a. The digit slide is then allowed to move upwardly under pressure of spring 58 and engage the 3 tooth on rack 48 to stop the rack in its travel. Stationary bars 59 and 60 guide the slide in its upward movement. The set-up of the numeric character 3 at the printing line is thus completed.

From Fig. 3 it is seen that the release of digit slide 51 during the reading of the 12, X and 0 index point positions is prevented by the high dwell surface on a cam member 61 secured to constantly rotating shaft 62. This cam 61 is so shaped as to allow the digit slide to move upwardly to intercept the rack 48 after 42.5° of the cycle when released by the trigger 56. The cam 61 starts to restore the digit slide 51 at approximately 318° and continues until 6° of the following cycle.

In order to assist in the restoration of the digit slide, the tension of spring 58 is removed. The spring 58 is free to move in a cylindrical opening in a support housing 63. A plunger 64 is mounted on an arm 65 and is free to move within the cylindrical opening to engage the lower end of the spring 58. Arm 65 is fastened on a rotatably mounted rod 66 which carries a cam follower 67. A spring 68 holds the cam follower roller 69 against the surface of a cam 70 secured to a shaft 71. This cam 70 holds the plunger 64 against the spring 58 from 35° of the cycle until 228° (Fig. 3) whereupon the plunger is moved downwardly to release the digit slide 51 from pressure of the spring 58. When cam 61 restores the digit slide at 318°, the spring 58 does not resist movement of the digit slide, whereby a rapid restoring action is obtained.

The trigger 56 is restored by a cam member 72 which is secured to the constantly rotating shaft 71. This cam member carries a finger designated 73 which projects outwardly therefrom. When trigger 56 is in the clockwise position described above, a raised portion 56b on the lower arm of the trigger lies in the path of the finger 73. Again from Fig. 3 it is seen that the finger 73 is arranged on cam member 72 to engage the trigger portion 56b at 44° of the cycle to restore the trigger at the 1 time. In this manner, a single print magnet 53 and associated trigger mechanism is used to set up a numeric character or asterisk (*).

In setting a zero at the printing line, the rack is intercepted by the digit slide engaging the zero tooth. The magnet 53 is energized by a print zero impulse which occurs after 9 time. This print zero impulse is a machine impulse as explained hereinafter in connection with the circuit diagram. Similarly, an asterisk is set at the printing line by the digit slide engaging the asterisk tooth on the rack. The slide is released by a machine impulse which is sent to the magnet 53 after print 0 time.

The rack 48 (Fig. 1) is provided with a row of teeth on the upper surface which are in mesh with a small gear 74 secured to a shaft 75. Also fastened to shaft 75 is a large gear 76 which is in mesh with the lower segment of a type wheel 77, rotatably mounted on a rod 78, to position the wheel so that a blank is at the printing line. The periphery of wheel 77 is formed with a plurality of gear teeth 79, the ends of which can be flattened to provide a type element face. Wheel 77 has a type element for each of the numeric characters 0 through 9 and the special character *. As the wheel is moved clockwise, the type elements pass the printing line in the order 1–9, 0 and *. A type aligner bail arm 80 is pivotally mounted at 82 and carries a roller 83 which is maintained in constant engagement with aligner bail cam 26 under influence of a spring 84. The aligner bail 81 is brought into engagement with the teeth 79 of wheel 77 at 216° cycle timing (Fig. 3) by the aligner bail cam 26. This device is operable to bring the type wheel 77 into perfect alignment for the printing operation which follows.

With the type wheel thus positioned, the printing platen is actuated to take an impression therefrom. This platen is shown at 89 in Fig. 1 carrying a print pad 90 and is supported by a pair of toggle links 91 and 92. Link 91 is pivotally mounted at 94 in a slotted portion of a support bracket 96. The upper portion of link 91 has an extension which carries a cam follower 93. This follower is held in constant engagement with a print cam 97 through a coil spring 95. This cam is secured on the constantly rotating shaft 86. Link 92 is pivotally connected to the lower portion of link 91 and to a rod 98 extending from platen 89. A vertically movable arm 99 extends from rod 98 to a support bar 100 and acts as a guide for the platen 89 when it is actuated. A second guide arm 101 extends from pivot 94 to rod 98 and serves to maintain the links 91 and 92 in proper operating alignment.

At approximately 223° cycle timing (Fig. 3) cam follower 93 drops into the depression in print cam 97, and toggle links 91 and 92 straighten out under influence of spring 95 to move platen 89 downwardly. This movement drives print pad 90 against the card positioned between the type wheel 77 and the platen 89 to effect printing on the card of the character at the printing line at approximately 228°. After printing time the platen 89 starts to restore and reaches a fully restored position at 290°.

An inking ribbon 102 extends across the type wheels 77 to permit an impression to be made on a card at the printing line. This ribbon 102 is fed by well known ribbon feeding mechanism which restrains the ribbon from movement during printing time as shown in Fig. 3. The usual devices are provided at the printing station to guide the cards therethrough and properly support them during the printing operation.

*Mechanical contacts closing device*

A T-shaped pawl 115 is pivotally mounted on a bail 116 which in turn is secured to the type rack follower arm 40. An arm 117 is pivotally mounted on a rod 118 extending through a comb support member and rests against pawl 115 which holds it away from contact with rack arm 47. Pawl 115 is free to move within a space provided between rack arm 47 and arm 117. At 11° cycle timing pawl 115 moves upwardly with arm 40 which is under the influence of cams 44 and 45. The rack 48 begins to move to the right at 11° and is stopped at differential times as previously explained. Two cycle points after rack 48 is stopped, the pawl 115 encounters a projection 47a located at the lower end of rack arm 47. As pawl 115 moves upwardly and over this projection, arm 117 is moved clockwise about rod 118. The lower portion of arm 117 carries an insulated button which is in constant engagement with a wire contact spring 119 mounted in an insulating block 120 and biased away from contact with a contact bar 121. The clockwise movement of arm 117 moves wire 119 into contact with the bar 121 to cause closure of the contacts. A similar wire contact spring (not shown) is provided for each printing position and is operated by similar mechanism. The closing of these contacts at the same time that the reading of the perforations by the checking brushes CB occurs causes a comparing magnet to be energized which will be explained in detail hereinafter in connection with the description of the error detecting circuits.

*Perforation of card columns*

It is well known to those skilled in the art, that when cards are perforated to represent numerical information according to the IBM system of numerical designation, each card column must be perforated at only one index position. In order that each column of a field be perforated to represent a complete number, it is also essential that columns to the left of the digits 1–9 representing the highest denominational order be perforated at the 0 index point positions. Therefore, a correctly punched card representing numerical information has only one perforation in each column and the absence of a perforation or the occurrence of more than one perforation in any column represents an incorrectly punched card. The machine disclosed herein is provided with improved means for detecting the absence of a required perforation or the presence of an unwanted perforation in each card column from which selectable printing data is derived. The improvement will be described more particularly in connection with the wiring diagram of Fig. 5a through 5c and the associated timing chart of Fig. 4.

*Circuit diagram*

In machines of this type, it is desirable that circuits which are closed through perforations in the card to print magnets 53 be interrupted before the brushes RB leave the perforations in order to prevent arcing at the brushes. Similarly it is desirable to prevent arcing upon closure of an error detection circuit through the brushes CB. Circuit breaker contacts C35 and C37 are provided, the timing of which is shown in Fig. 4. These contacts are adapted to be closed by dentated cams 122 and 123 respectively rotated by a shaft (not shown) which is suitably driven from the motor M so as to rotate once for each rotation of the main cam shaft 46. Contacts C35 and C37 are connected in series and are closed just after the brushes RB and CB make contact with roller 30 and open such contact before the perforation has left the brushes.

The constantly rotating shaft 86 carries a number of contact operating cams which close contacts designated C1, C2, C3, etc. The timing of these cam contacts is shown in Fig. 4. In addition, a number of wires in the circuit diagram terminate in plug sockets or hubs indicated by small circles between which connections are made in accordance with the particular requirements of the information to be printed by the machine. In the actual machine, the plug sockets are extended to the rear of a plug board on which they are grouped and identified.

Referring to Fig. 5a, closure of the main line switch S will condition the circuit for the start motor M for subsequent completion upon the energization of a relay R14. A suitable D. C. voltage is provided across the lines 125 and 126. Closure of start key contacts 127 will establish a circuit from line 125 through the normally closed "b" contacts of a check stop relay R12, start key contacts 127, the pickup coil of a relay R10 to line 125. Energization of a start relay R10 closes its "a" contacts to complete a circuit through the hold coil of relay R10 as follows: From line 125, through the normally closed "b" contacts of check stop relay R12, stop key contacts 128 (normally closed), "a" contacts of relay R10, hold coil of relay R10 to line 126. The "b" contacts of relay R10 are also closed by the energization of relay R10 to complete a circuit through the motor control relay R14. The relay R14 closes its "a" contacts to supply current to the driving motor M through the A. C. voltage supply as indicated. In addition, the closure of the "b" contacts of the start relay R10 causes the magnet 20 to be energized. This magnet 20 controls the card feeding mechanism as explained previously in connection with the mechanical description.

When the machine is placed in proper operation, the cards are fed from the magazine 11 to the reading station. As the leading edge of the first card engages the card lever 32, the contacts CL1 are closed and relay R16 is energized at 0° of the following cycle (Fig. 4) when cam contacts C1 are closed. Energization of this relay closes its "a" contacts (Fig. 5b) which complete a circuit through the pick-up coil of a relay R18 when cam contacts C5 close at 20°. This relay R18 closes its "a" contacts (Fig. 5a) to complete a circuit through its hold coil and cam contacts C2 (now closed). Relay R18 also closes its "b" contacts which control the impulses from circuit breaker cams 122 and 123 (Fig. 5b).

In setting up the machine for operation, the printing positions one through fourteen are settable by plug connections (not shown) to print a selected digit 0–9 through well known printing circuits. The error detection circuits which comprise the present invention are disclosed in the printing positions of an amount field where asterisks are printed in all columns of the amount field to the left of a significant digit and a zero is printed in columns to the right of a significant digit. Since two duplicate amount fields are to be printed on each check, one in printing positions sixteen through twenty-one, twenty-nine and thirty, the other in printing positions thirty-seven through forty-four, the relays which provide zero and asterisk printing are used for both amount fields.

The analyzing brushes RB in the card columns in which the amount is punched are wired to the asterisk and zero control print entry hubs. For purposes of this description let us suppose that the punched amount field begins at column 1 as shown in the card of Fig. 2. Referring now to Figs. 5b and 5c, a plug connection 130 is made from the hub 131 of the brush RB in the card column 1 to the asterisk and zero control print entry hub 132. The print entry hub 133 for printing position sixteen is connected by pluggable wire 134 with the asterisk and zero control print exit hub 135. The print entry hub 136 for printing position 37 is similarly connected by pluggable wire 137 with asterisk and zero control print exit hub 138, thereby utilizing the same asterisk and zero printing devices for both amount fields. Similar plug connections are made from the other analyzing brush hubs in the columns of the punched amount field and the print entry hubs to the related asterisk and zero control print hubs. Since the amount field includes eight card columns, eight asterisk and zero control print and proof entry devices are shown, it being understood that any desired number of such devices can be provided to accommodate the columns in any card amount field.

The checking brushes CB in the punched amount field are wired to the asterisk and zero control proof entry hubs. A plug connection 139 is made from the hub 140 of the brush CB in the card column 1 to the asterisk and zero proof entry hub 141. The proof entry hub 142 (Fig. 5a) for printing position sixteen is connected by pluggable wire 143 with the asterisk and zero control proof exit hub 144. The proof entry hub 145 for printing position 37 is connected by wire 146 with asterisk and zero control proof exit hub 147. In a similar manner plug connections are made from the other checking brush hubs in the punched amount field and the proof entry hubs to the related asterisk and zero control proof hubs.

Referring now to the card shown in Fig. 2, it is seen that columns 1, 2 and 3 of the punched amount field have zero punches therein. Since the first significant digit is contained in column 4, an asterisk will be printed in response to the sensing of the zero perforations in columns 1–3 by brushes RB as explained hereinafter. The first significant digit is punched in the 8 index position in column 4. When cam contacts C3 close at 36°, a relay R20 (Fig. 5b) is energized and closes contacts "a" through "h" (Fig. 5c) which prepare the asterisk and zero control print circuits to sense an impulse to print magnets 53 in response to the sensing of a significant digit perforation by brushes RB. When this 8 perforation is sensed by brushes RB, a circuit is completed to the print magnet 53 in printing position 19 as follows: From line 125, through circuit breaker contacts C35 and C37, relay contacts R18b (now closed), common brush 170, contact roller 30, hole in card, analyzing brush RB in column 4, hub 131, pluggable wire 130, hub 132, relay contacts R20d, hub 135, pluggable wire 134, hub 133, print magnet 53 in position 19 to line 126. A parallel path extends from relay contacts R20d to line 126 through relay contacts R22d (normal) and pick-up coil of relay R30. The energization of print magnet 53 in position 19 causes the print selector mechanism to set up an 8 digit at the printing line in a manner explained previously in the mechanical description. The magnet 53 in printing position 40 is energized through the same circuit connections by suitable wire connections. The relay R30 closes its "a" contacts (Fig. 5a) and is held energized through cam contacts C2 which were closed at 20°.

The checking brushes CB sense the same perforation in the card two cycle points after the brushes RB to check the accuracy of the set-up of the printing mechanism. A comparing circuit is completed through brushes CB as follows: From line 125 through circuit breaker contacts C35, C37, relay contacts R18b, common brush 170, contact roller 30, hole in card, checking brush CB in column 4, hub 140, wire 139, hub 141, relay contacts R38d (normal), relay contacts R40d (normal), hub 144, wire 143, hub 142, comparing relay magnet coil M19a to line 126. A similar circuit extends from the checking brushes CB in printing position 40 through hub 147, wire 146, hub 145 and the comparing relay magnet coil M40a. The comparing relay magnets are of the bucking coil type in which one coil is connected and positioned in such a way that its magnetic field opposes the magnetic field of another coil. The closure of wire contacts 119 in printing positions 19 and 40 at the same time that the brushes CB sense the 8 perforation completes a circuit to energize the b coils of magnets M19 and M40 as follows: From line 125, through circuit breaker contacts C35 and C37, relay contacts R18b, wire 150, common contact bar 121, parallelly connected wire contacts 119 in printing positions 19 and 40 and comparing magnet coils M19b and M40b to line 126. The energization of both comparing coils simultaneously causes the magnetic fields to cancel so that the armatures of these magnets are not moved. The armatures of the M designated magnets are associated with normally open contacts 149 (Fig. 5a) so that when any armature is attracted, the related contacts 149 are closed to pick up relay R12. This relay then opens its "b" contacts to drop out relays R10 and R14 and open the motor running circuit. The relay contacts R12a are closed to pick up an error signal light SL.

*Asterisk printing to left of a significant digit*

Referring again to the card shown in Fig. 2, it is seen that a zero is punched in columns, 1, 2 and 3 of the amount field. When cam contacts C4 close at 144°, relay R22 is energized transferring its contacts "a" through "h" in the asterisk and zero control print entry circuits. The relay R20 is dropped out when cam contacts C3 open at 144° and the sensing of the zero perforation by brushes RB in column 3 did not pick the asterisk and zero control print relay R28 because relay R20 was not energized at that time and its "a" through "h" contacts were open. Closure of cam contacts C8 at 157° completes a circuit to the print magnets in printing positions 16, 17 and 18, and 37, 38 and 39 as follows: From line 125 through circuit breaker contacts C35, C37, relay contacts R18b, cam contacts C8, wire 151, relay contacts R24b (normal), relay contacts R22a (transferred), hub 135, wire 134, hub 133 to print magnet 53 for print position 16 to line 126. Hub 138 sends an impulse through wire 137 to print magnet 53 in print position 37. A branch circuit extends from the relay contacts R24b, through relay contacts R26b (normal), relay contacts R22b (transferred), hub 152, wire 153, print entry hub 154, print magnet 53 of position 17 to line 126. Another branch circuit extends from the relay contacts R26b, through relay contacts R28b (normal) relay contacts R22c (transferred), hub 155, wire 156, print entry hub 157, print magnet 53 of position 18 to line 126. Hubs 160 and 161 send impulses through wires 162 and 163 to the print magnets 53 in print positions 38 and 39. From the timing chart of Fig. 4 it is apparent that these magnets 53 are energized at the proper time to cause the release of the digit slide 51 (Fig. 1) to engage the asterisk tooth on rack 48. This causes an asterisk to be set on the type wheel 77 at the printing line. Since the asterisk and zero print relay of a position having a significant digit will be energized, all print positions to its right having no significant digit will send an impulse from wire 158 to its print magnet 53 when cam contacts C7 close earlier at 145°. This is zero time and a 0 is set up on the type wheel 77.

*Checking zero and asterisk setting*

A relay R38 is energized at 20° of the cycle when cam contacts C5 are closed (Fig. 5b). This relay transfers its "a" through "h" contacts to permit an impulse to the asterisk and zero control proof relays at 12, X and 0 time only. When the checking brushes CB in card columns 1, 2 and 3 sense the zero perforations, the control relays R42, R44 and R46 are energized through the following circuit: From line 125 through circuit breaker contacts C35, C37, R18b, contact roller 30, hole in card, checking brushes CB in column 1, hub 140, wire 139, hub 141, relay contacts R38a (transferred), pick-up coil of relay R42 to line 126. Relay R42 closes its "a" contacts to establish a circuit through its hold coil and cam contacts C2 which are now closed. Relays R44 and R46 are energized through similar circuits. The energization of these relays causes closure of their "b" contacts to permit an impulse from the circuit breakers C35 and C37 to go to the comparing magnets M16, M17 and M18 at asterisk proof time. A relay R40 is energized when cam contacts C6 close at 168°. The cam contacts C10 are closed at 184° to allow the circuit breakers to send an impulse through the following circuit: From line 125 through circuit breakers C35, C37, relay contacts R18b, cam contacts C10, wire 164, relay contacts R24c (normal), relay contacts R42b (now closed), relay contacts R40a (transferred), hub 144, wire 143, hub 142, coil M16a of comparing relay magnet M16 to line 126. The coils M17a and M18a are energized by similar circuits through relay contacts R26c and R28c respectively. Similar circuits are established to the coils M37a, M38a and M39a of the comparing relay magnets in printing positions 37, 38 and 39. Since the asterisk and zero print relay of a position having a significant digit will be energized, all print positions to its right having no significant digit will send an impulse from wire 159 to the "a" coil of its comparing relay magnet when cam contacts C9 close at 172°. This is zero proof time and a matching impulse must be sent to the "b" coils of these comparing relay magnets. This matching impulse is provided from the closure of wire contacts 119.

*Error detection*

If a column to the right of a significant digit has no punching, neither the asterisk and zero control print nor proof relay will be picked up. An asterisk print impulse will then be sent to the print magnet in that column and the closure of contacts 119 will energize the "b" coil of the comparing magnet. The comparing magnet "a" coil for the column will not receive an impulse because the brushes CB did not sense a perforation and the asterisk and zero control proof relay was not energized. Therefore, no matching impulse can be sent to the comparing magnet at asterisk proof time. In the case of no punching to the left of a significant digit, the blank column detection operates in a similar manner, except that the print magnet will receive a print zero impulse instead of an asterisk impulse.

In the instance of a column having a double digit punching, the first digit impulse closes the mechanical contacts 119 to energize the "b" coil of the comparing magnet. The "a" coil receives a matching impulse when the brushes CB sense the first digit punching. The second digit punching energizes the "a" coil of the comparing magnet for that column, when read by the checking brushes. However, the mechanically operated contacts cannot again close, as previously explained, and there is no matching impulse to energize the "b" coil and an error is indicated.

In the instance of a zone and digit punching in a column, both the asterisk and zero control print and proof relays are energized. This causes a zero proof impulse to energize the "a" coil of the comparing magnet in that column. Since the impulse from the sensing of the digit punching by the brushes RB has already closed the mechanical contacts, they cannot again close for the print zero impulse. It is noted that the sensing of a 0 punching in a card column by brushes RB does not transmit an impulse because the relay R20 has not been picked up at this time. This relay is picked by cam contacts C3 after the 0 index point position has passed brushes RB. The brushes CB actually read a zero punching and store them in the asterisk and zero control proof relays R42—R56.

*Summary of operation*

In order that the operation of the error detecting circuits of this invention may be better understood, a brief summary of their operation will now be given.

In the instance where a card column is perforated in two digit index point positions, the first perforation to be sensed by the reading brushes RB causes the print magnet 53 (Fig. 1) in that column to be energized to release the related digit slide 51 which in turn intercepts its rack 48. The stopping of this rack causes the digit represented by the perforation sensed to be set at the printing line and closure of the mechanical contacts 119 to complete a circuit through the "b" coil of the comparing relay magnet for that column. Two cycle points later the same perforation is sensed by the checking brushes CB which completes a circuit to the "a" coil of the comparing relay.

The two coils are energized simultaneously, since the mechanical contacts 119 are designed to close two cycle points after the sensing of the perforation by the reading brushes. The structure of these contacts is such that closure can only be effected once during each machine cycle. When the second digit is sensed by the reading and checking brushes, an error is indicated by the comparing relay because no impulse is available from the mechanical contacts to the comparing relay to match the impulse from the brushes CB.

In the instance of a card column being perforated in a zone and a digit index point position the first perforation sensed by the reading brushes RB is the one in the zone position. Since cam contacts C3 (Fig. 5b) do not close until 36° of the cycle, the relay R20 is not energized until after the zone positions have passed the reading brushes. The energization of this relay closes its "a" through "h" (Fig. 5c) contacts to allow an impulse to be sent from brushes RB to the print magnets 53 of those columns where a significant digit perforation is found. The energization of the magnet 53 of a column in response to the sensing of a digit perforation causes the digit represented by the perforation to be set at the printing line and closure of the contacts 119 as explained before to complete a circuit through the "b" coil of the comparing relay magnet for that column. A circuit to the "a" coil of the comparing relay is completed simultaneously through checking brushes CB. Relay R20 is dropped out when cam contacts C3 open after the 9 index position has been sensed by brushes RB and closure of cam contacts C4 at 144° causes energization of relay R22 which transfers its "a" through "h" contacts in the print entry circuits. The asterisk and zero control print relays R24 to R37 are energized in all columns having a significant digit but are only effective to control the printing in columns to the left of the column having the highest significant digit. Energization of this relay in the highest significant digit column transfers its "b" contacts to prevent a print zero impulse from reaching the magnets 53 related to those columns to the left when cam contacts C7 close at 145°. An asterisk impulse is available to these magnets when cam contacts C8 close at 157°. The asterisk and zero control print circuits are thus prepared to send a second impulse to the print magnets when cam contacts C7 and C8 close. This second impulse to the print magnet has no effect on the print selector mechanism because the digit slide 51 has not yet been restored from its actuation by the first impulse to magnet 53.

The relay R38 is energized at 20° of the cycle to close its "a" through "h" contacts in the asterisk and zero control proof circuits to permit an impulse to be sent to the proof zero control relays R42 to R56 in response to the sensing of the zone perforation by the brushes CB. When a proof relay is energized, it closes its "b" contacts to condition the proof circuit for that column to send a later timed impulse to the "a" coil of the comparing magnet for that column. At 168° the cam contacts C6 close to energize the relay R40 and transfer its "a" through "h" contacts which permits an asterisk or zero proof impulse to go to the "a" coil of the comparing relay at 172°. When cam contacts C9 close at 172°, all columns to the right of the highest significant digit column which have no significant digit will send a proof zero impulse to the "a" coil of its comparing relay magnet. At 184° cam contacts C10 are closed to send a proof asterisk impulse to the "a" coil of the comparing magnets in all columns to the left of the column having the highest significant digit. It is thus apparent that a proof impulse will be sent to any column in which the proof zero control relay R42 to R56 has been energized. Since the print selector mechanism has already been activated by the digit perforation, no matching impulse is available to the "b" coils of the comparing relays through the mechanical contacts 119 and an error is indicated.

In the case of a card column having no perforation in either the zone or digit index point positions, the reading brushes RB sense a blank column. Since the relay R20 only permits the brushes RB to sense the digit index point positions, a zero perforation is detected by the lack of a significant digit perforation in a column. Therefore, a blank column causes either a zero or an asterisk to be set at the printing line for that column. Since the error detecting circuits check the presence of a zero perforation by the brushes CB actually sensing the perforation, no zero or asterisk proof impulse would be provided to the "a" coil of the comparing relay magnet in that column to match the energization of the "b" coil from the closure of mechanical contacts 119 which are closed two cycle points after the print magnet 53 receives the zero or asterisk print impulse.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a cyclically operable printing machine in which record cards are fed in succession past first and second sensing stations and having means at the first station to sense a columnar order of a record having a series of index point positions in which a value designation is effected in solely one index point position but may have an additional unwanted designation at a second index point position, a type carrier, means for positioning said carrier once during a machine cycle, supplemental sensing means at the second station to sense said index positions for a value designation after such designation has been sensed by the first sensing means, a relay comprising two oppositely wound coils, means responsive to the sensing of a designation by the first sensing means to cause said positioning means to position said carrier, means under control of said positioning means to effect energization of one coil of said relay, circuit means under control of said supplemental sensing means to effect energization of the other coil of said relay in response to the sensing of the first designation by said supplemental sensing means at the time said one relay coil is energized, whereby energization of both relay coils causes said relay to be ineffective, said other coil being again energized upon the sensing of a second designation by said supplemental sensing means to activate said relay, and means under control of said relay when activated to indicate an error.

2. In a cyclically operable printing machine in which record cards are fed in succession past first and second sensing stations and having means at the first station to sense a columnar order of a record having a series of index point positions in which a value designation is effected in solely one index point position but may have an additional unwanted designation at a second index point position, a type carrier, means for positioning said carrier once during a machine cycle, supplemental sensing means at the second station to sense said index positions for a value designation after such designation has been sensed by the first sensing means, a relay comprising two oppositely wound coils, means responsive to the sensing of a designation by the first sensing means to cause said positioning means to position said carrier, contact means under control of said positioning means, said contact means being closed by said positioning means when actuated, circuit means under control of said contact means when closed to effect energization of one coil of said relay, an error detecting circuit under control of said supplemental sensing means to effect energization of the other coil of said relay in response to the sensing of the first designation by said supplemental sensing means at the time said one relay coil is energized, whereby energization of both relay coils causes said relay to be ineffective, said other coil being again energized upon the sensing of a second designation by said supplemental sensing means to activate said relay, and means under control of said relay when activated to indicate an error.

3. In a cyclically operable printing machine in which record cards are fed in succession past first and second sensing stations and having means at the first station to sense a columnar order of a record having zone and digit index positions in each order and in which a digit designation is effected in solely one digit index point position but may have an additional unwanted designation at a second digit index point position, a type carrier, means for positioning said carrier, a magnet for controlling said positioning means, supplemental sensing means at the second station to sense said index positions for a value designation after such designation has been sensed by the first sensing means, means for actuating said positioning means once during a machine cycle, means for making said first sensing means effective to read digit index positions only, means for energizing said magnet in response to the sensing of a digit designation by the first sensing means to cause said positioning means to position said type carrier to represent the digit sensed, a relay comprising two oppositely wound coils, first circuit means under control of said positioning means to effect energization of one coil of said relay, second circuit means under control of said supplemental sensing means to effect energization of the other coil of said relay in response to the sensing of the first digit designation by said supplemental sensing means at the time said one relay coil is energized, whereby energization of both relay coils causes said relay to be ineffective, said other coil being again energized upon the sensing of a second digit designation by said supplemental sensing means to activate said relay, and means under control of said relay when activated to indicate an error.

4. In a cyclically operable printing machine in which record cards are fed in succession past first and second sensing stations and having means at the first station to sense a columnar order of a record, said record having a designation in a digit index point position but in which a surplus designation may occur in a zone index point position, a type carrier, means for positioning said carrier, means to actuate said positioning means once during a machine cycle, a magnet for controlling said positioning means, said magnet being incapable of controlling said positioning means upon a second energization in the same cycle when transmission of a timed impulse thereto is effected, supplemental sensing means at the second station to sense the index positions for a digit designation after such digit designation has been sensed by the first sensing means, a reversely wound relay having two oppositely wound coils, means for rendering said first sensing means ineffective to sense zone index positions and effective to sense and digit index positions, means for energizing said magnet in response to the sensing of a digit designation by the first sensing means to cause said positioning means to position said type carrier to represent the digit sensed, a circuit closing means under control of said positioning means to effect energization of one coil of said reversely wound relay, circuit means under control of said supplemental sensing means to simultaneously effect energization of the other coil of said relay in response to the sensing of the digit designation by said supplemental sensing means, whereby energization of both coils at the same time causes said relay to be ineffective, a timed contact means for sending said timed impulse to energize said magnet and operative after the last index point postion has passed the first sensing means, said magnet being ineffective at this time upon transmission of said timed impulse in the same cycle to operate said positioning means and cause energization of said one coil of said relay, said other coil being again energized to activate said relay after the sensing of said zone designation by said supplemental sensing means, and means under control of said relay when activated to indicate an error.

5. In a cyclically operable printing machine in which record cards are fed in succession past first and second sensing stations and having means at the first station to sense a columnar order of a record, said record having a designation in a zone index point position but in which a surplus designation may occur in a digit index point position, a type carrier, means for positioning said carrier, means to actuate said positioning means once during a machine cycle, a magnet for controlling said positioning means, supplemental sensing means at the second station to sense the index positions for a digit designation after such digit designation has been sensed by the first sensing means, a differential relay having two oppositely wound coils, means for rendering said first sensing means ineffective to sense zone index positions and effective to sense said digit index positions, means for energizing said magnet in response to the sensing of a digit designation by the first sensing means to cause said positioning means to position said type carrier to represent the digit sensed, a circuit closing means under control of said positioning means to effect energization of one coil of said differential relay, circuit means under control of said supplemental sensing means to simultaneously effect energization of the other coil of said relay in response to the sensing of the digit designation by said supplemental sensing means, whereby energization of both coils at the same time causes said relay to be ineffective, a first timed contact means for sending another impulse to energize said magnet and operative after the last index point position has passed the first sensing means, said magnet being ineffective at this same time in the same cycle to operate said positioning means and cause energization of said one coil of said relay, a second timed contact means for sending an impulse to said other coil which is again energized to activate said relay after the sensing of said zone designation by said supplemental sensing means, and means under control of said relay when activated to indicate an error.

6. In a printing machine for detecting blank columns of record cards in which a digit designation should appear in each column but may be blank in the absence of a designation, means for feeding said record cards in succession past first and second sensing stations and having means at the first station to sense the columns of a record, a type carrier for each column, means for positioning said type carrier including a magnet for controlling said positioning means, supplemental sensing means at the second station to sense a column for a digit designation after such designation has been sensed by the first sensing means, means for energizing said magnet in response to the sensing of said digit designation by the first sensing means to cause said positioning means to position said type carrier to represent the digit sensed, said energizing means being ineffective when a digit designation is not sensed, a differential relay having two oppositely wound coils which is rendered inactive upon energization of both coils and active upon energization of only one coil, means for sending an impulse to said magnet upon failure of said first sensing means to sense a designation and operative after said first sensing means has completed sensing of a card fed past said sensing means to energize said magnet and control said positioning means to position said type carrier, means under control of said positioning means when said magnet is energized by said impulse to effect energization of one coil of said relay, circuit means under control of said supplemental sensing means for sending an impulse to effect energization of the other coil of said relay in response to the sensing of a designation by said supplemental sensing means at the time said one relay coil is energized to prevent the activation of said relay, the absence of a designation and failure to be sensed by said supplemental sensing means causing said circuit means to be ineffective to cause energization of said other coil, whereby said relay is activated, and means under control of said relay when activated to indicate an error.

No references cited.